A. E. MOOS.
ICE CREAM SPOON.
APPLICATION FILED DEC. 13, 1916.

1,224,007.

Patented Apr. 24, 1917.
2 SHEETS—SHEET 1.

WITNESSES

INVENTOR
A. E. Moos,
BY Victor J. Evans
ATTORNEY

A. E. MOOS.
ICE CREAM SPOON.
APPLICATION FILED DEC. 13, 1916.
1,224,007.
Patented Apr. 24, 1917.
2 SHEETS—SHEET 2.
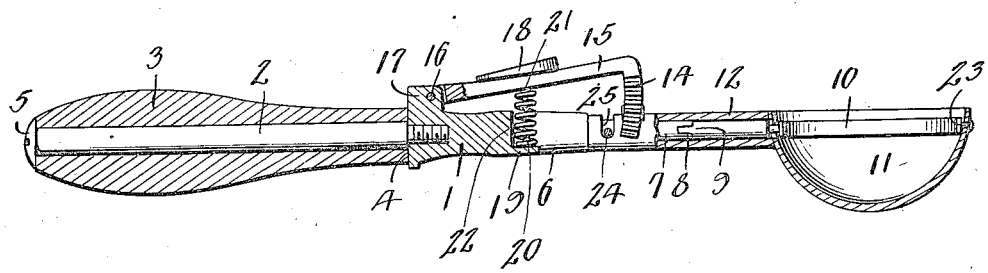
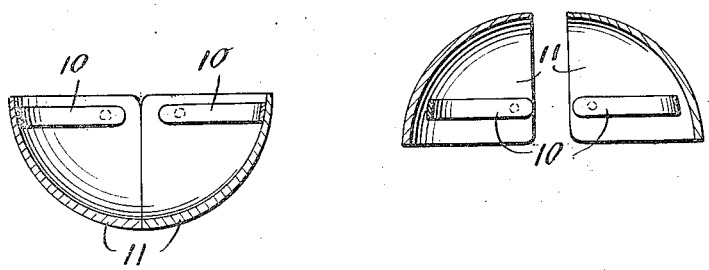
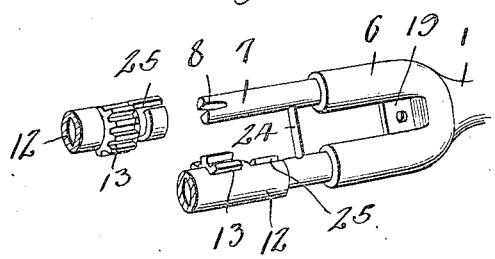
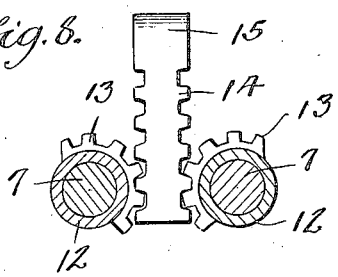
INVENTOR
A. E. Moos,
BY Victor J. Evans
ATTORNEY
WITNESSES

UNITED STATES PATENT OFFICE.

AUGUST E. MOOS, OF NOKOMIS, ILLINOIS.

ICE-CREAM SPOON.

1,224,007.  Specification of Letters Patent.  Patented Apr. 24, 1917.

Application filed December 13, 1916. Serial No. 136,779.

*To all whom it may concern:*

Be it known that I, AUGUST E. Moos, a citizen of the United States, residing at Nokomis, in the county of Montgomery and State of Illinois, have invented new and useful Improvements in Ice-Cream Spoons, of which the following is a specification.

This invention relates to ice cream spoons, of the type now commonly employed for scooping ice cream from a can or receptacle and depositing the contents thereof into an ice cream cone or similar receptacle, the object of the invention being to produce an article of the character referred to in which the several parts are so combined and arranged in relation to each other that said parts may be readily disassociated for cleansing purposes, enabling the spoon to be kept in a sanitary condition.

A further object in view is to provide a spoon which will insure the depositing of the contents thereof in the final receptacle, avoiding the waste of ice cream which is frequently caused by the improper discharge thereof from the spoon or scoop employed.

A further object in view is to so combine the separable parts of the article that it is impossible for them to become accidentally disconnected in the ordinary operation of the working parts thereof.

With the above and other objects in view, the invention consists in the novel construction, combination and arrangement of parts, herein described, illustrated and claimed.

In the accompanying drawings:—

Fig. 4 is a vertical longitudinal section through the spoon.

Fig. 5 is a cross section through the spoon on the line 5—5 of Fig. 1, showing the position of the sections of the bowl when in their initial or scooping position.

Fig. 6 is a cross section on the line 6—6 of Fig. 2 showing the bowl sections in their final or discharging position.

Fig. 7 is a fragmentary perspective view illustrating the manner of connecting and disconnecting the bowl sections and the handle.

Fig. 8 is a cross section taken adjacent to the rack and sector gears.

Figure 1:
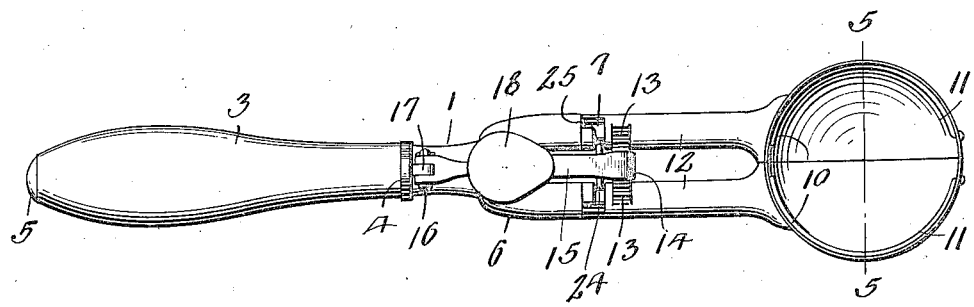
Figure 1 is a top plan view of an ice cream spoon embodying the present invention.
Figure 2:
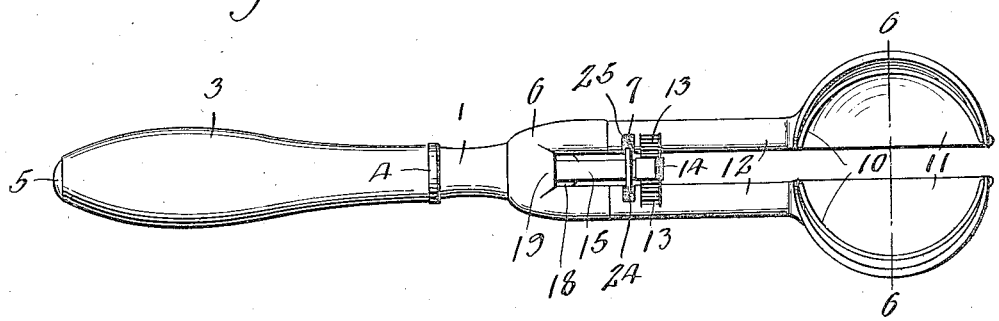
Fig. 2 is a bottom plan view of the same.
Figure 3:
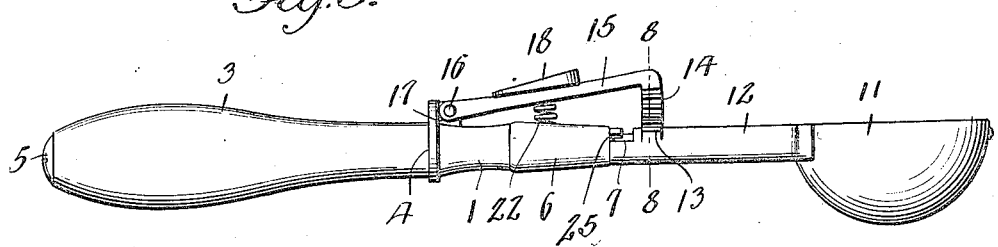
Fig. 3 is a side elevation thereof.

The ice cream spoon contemplated in this invention comprises a frame member 1 having a shank 2 which passes through a hand grip 3 of wood or other suitable material, the latter being secured in place on the shank 1 and against a flange or shoulder 4 at the inner end of the shank by means of a fastener 5 at the butt end of the handle. The frame of the handle comprises a bifurcated head 6 and extending from the branches thereof are journals 7 arranged in spaced parallel relation to each other and provided in the extremities thereof with slots or notches 8 to receive the adjacent tangs 9 of a pair of semi-circular scrapers 10, the tangs 9 being held in the slots 8 by the resiliency of spring action of the scrapers 10 which are of hard rolled metal.

Mounted on each of the journals 7 is one of a pair of sphero-quadrantal scoop or bowl sections 11, each of said sections being fixedly related to and carried by an arm or rock shaft 12 the extremity of which is formed with a bore to receive the respective journal 8. Each rock shaft 12 has formed integrally therewith a sector gear 13. The sector gears 13 normally face toward each other and mesh with and engage the opposite toothed faces of a rack 14 which is carried by the free end of a scoop or bowl operating lever 15 shown in the form of a thumb lever, the same being connected by a detachable pivot bolt or pin 16 to a lug 17 on the handle frame adjacent to the flange 4. The lever 15 is provided with a relatively broad thumb-piece 18 located between the ends thereof.

In the crotch of the forked head 6 is a web or foundation piece 19 from which extends a spring engaging and holding pin or stud 20. Another stud 21 projects from the adjacent side of the lever 15, and a coiled expansion spring 22 is interposed between the lever 15 and the web 19 and has one end thereof in engagement with the pin or stud 20 and the other end thereof in engagement with the pin or stud 21. The spring 22 therefore operates to move the free end of the lever 15 away from the handle frame, the expansive action of said spring being thus utilized to rock the sections of the scoop or bowl to their receiving positions in which they form a hollow and substantially hemispherical bowl. When the lever 15 is pressed in the opposite direction, it overcomes the tension of the spring 22 and causes the bowl sections to be rocked to the opposite limit of their movement thereby shaping the mass of ice cream into spherical form and opening the scoop at the bottom so that the sphere of ice cream may be deposited in an ice cream cone or other receptacle with accuracy and certainty. Each of the scrapers is provided at its outer extremity opposite the tang 9 with a pintle 23 which is removably inserted through a bearing opening in the respective bowl section 11. This enables the scraper to be removed for cleaning purposes, said scraper being normally held fixed or stationary in relation to the handle frame so that as the scoop sections are rocked back and forth in contact with the outer surfaces of said scrapers, they will serve to effect a separation between the mass of cream and the inner surfaces of the sections of the scoop or bowl.

In order to provide for the ready removal and detachment of the sections of the scoop or bowl, a cross pin 24 connects the journals 7 at a suitable distance from the extremities thereof and each of the arms or rock shafts 12 is formed at the inner extremity thereof with a bayonet slot 25, the longitudinal portion of said slot enabling the respective arm or shaft 12 to be moved longitudinally of its journal 7 so as to move the arcuate or transverse portion of said slot into and out of engagement with the cross bar, pin or key 24. The length of the arcuate or transverse portions of the bayonet slots 25 is such that under the ordinary working limits of the sections of the scoop, the shafts or arms 12 cannot become disconnected from the pin 24, but by removing the pivot pin 16 and displacing the rack 14 entirely from between the sector gears 13, the bowl sections may be turned sufficiently to bring the longitudinal portions of the bayonet slots into line with the pin 24, whereupon the bowl sections may be withdrawn from the journals 7. To replace the bowl sections and their shafts or arms, the operation just hereinabove described is reversed.

From the foregoing description taken in connection with the accompanying drawings it will now be seen that the scoop or bowl sections with their shafts or arms may be readily detached from the frame of the device, the scrapers may be detached from the journals of the frame and also from the sections of the scoop or bowl. The thumb lever 15 may also be detached, and also the spring which operates said lever. Thus all members of the device may be disconnected easily and within a very short space of time, ordinarily requiring only about one-half of a minute. The parts are reassembled with equal facility. This enables all parts of the spoon to be thoroughly cleansed from time to time and maintained in a sanitary condition.

I claim:

1. In an ice cream spoon, the combination of a handle having journals extending therefrom and arranged in substantially parallel and spaced relation to each other, sphero-quadrantal bowl sections having extended shafts normally in spaced and substantially parallel relation to each other and mounted to oscillate on said journals, sector gear faces on said shafts, a thumb lever having a pivotal mounting on the frame and carrying a rack member having oppositely disposed toothed faces which simultaneously engage the sector faces on said shafts for oscillating the sections of the bowl, and a pin extending transversely between said journals, said shafts being formed with bayonet slots to engage said pin and enable said shafts to be connected to and disconnected from said pin by turning said shafts beyond their normal limit of turning movement.

2. In an ice cream spoon, the combination of a handle having journals extending therefrom and arranged in substantially parallel and spaced relation to each other, sphero-quadrantal bowl sections having extended shafts normally in spaced and substantially parallel relation to each other and mounted to oscillate on said journals, sector gear faces on said shafts, a thumb lever having a pivotal mounting on the frame and carrying a rack member having oppositely disposed toothed faces which simultaneously engage the sector faces on said shafts for oscillating the sections of the bowl, and a pin extending transversely between said journals, said shafts being formed with bayonet slots to engage said pin and enable said shafts to be connected to and disconnected from said pin by turning said shafts beyond their normal limit of turning movement, the pivot of said thumb lever being removable and thereby enabling said rack member to be moved entirely out of engagement with said sector gear faces.

3. In an ice cream spoon, the combination of a handle having journals extending therefrom and arranged in substantially parallel and spaced relation to each other, sphero-quadrantal bowl sections having extended shafts normally in spaced and substantially parallel relation to each other and mounted to oscillate on said journals, sector gear faces on said shafts, a thumb lever having a pivotal mounting on the frame and carrying a rack member having oppositely disposed toothed faces which simultaneously engage the sector faces on said shafts for oscillating the sections of the bowl, and a pin extending transversely between said journals, said shafts being formed with bayonet slots to engage said pin and enable said shafts to be connected to and disconnected from said pin by turning said shafts beyond their normal limit of turning movement, and substantially semi-circular scrapers bearing against the inner surfaces of the bowl sections and having a fixed relation to the frame.

4. In an ice cream spoon, the combination of a handle having journals extending therefrom and arranged in substantially parallel and spaced relation to each other, spheroquadrantal bowl sections having extended shafts normally in spaced and substantially parallel relation to each other and mounted to oscillate on said journals, sector gear faces on said shafts, a thumb lever having a pivotal mounting on the frame and carrying a rack member having oppositely disposed toothed faces which simultaneously engage the sector faces on said shafts for oscillating the sections of the bowl, and a pin extending transversely between said journals, said shafts being formed with bayonet slots to engage said pin and enable said shafts to be connected to and disconnected from said pin by turning said shafts beyond their normal limit of turning movement, and substantially semi-circular scrapers bearing against the inner surfaces of the bowl sections and having a fixed relation to the frame, each of said scrapers having a jointed connection with the respective bowl section and being detachable therefrom and from said frame.

In testimony whereof I affix my signature.

AUGUST E. MOOS.